United States Patent [19]
Bobo

[11] 3,879,879
[45] Apr. 29, 1975

[54] MINNOW SCOOPER AND HOLDER

[76] Inventor: Frank E. Bobo, 212 Algee St., Tiptonville, Tenn. 38079

[22] Filed: July 19, 1974

[21] Appl. No.: 489,996

[52] U.S. Cl. ................................................. 43/4
[51] Int. Cl. ........................................... A01k 97/00
[58] Field of Search ................................. 43/4, 55

[56] References Cited
UNITED STATES PATENTS

| | | | |
|---|---|---|---|
| 2,611,982 | 9/1952 | Sears | 43/4 |
| 2,883,783 | 4/1959 | Del Matter | 43/4 |
| 2,982,045 | 5/1961 | Highland | 43/4 |
| 3,059,369 | 10/1962 | Swanson | 43/4 |
| 3,803,743 | 4/1974 | Nalepka | 43/4 |

Primary Examiner—Louis G. Mancene
Assistant Examiner—Daniel J. Leach
Attorney, Agent, or Firm—John R. Walker, III

[57] ABSTRACT

A device for scooping up a minnow from a minnow bucket including provisions for holding the minnow in an optimum position while a fishhook is suitably attached thereto. The device includes a sieve like scoop which is provided with a rather large opening that allows the minnow to freely pass lengthwise therethrough into a wedge shaped holding trough defined by a pair of comb like holding elements having downwardly directed teeth enabling a fishhook to freely pass therebetween to engage the minnow. One of the holding elements is swingably attached to the scoop to allow this holding element to be yieldably urged away from the other holding element, thus providing a passageway to subsequently permit the hooked minnow to be exited from the trough through the bottom thereof.

12 Claims, 6 Drawing Figures

PATENTED APR 29 1975 3,879,879

MINNOW SCOOPER AND HOLDER

BACKGROUND OF THE INVENTION

1. Field of the Invention

This invention relates to the field of minnow dippers and holders.

2. Description of the Prior Art

Applicant is aware of the following U.S. Pat. Nos.: the Brecht et al, 2,531,551; the Sears, 2,611,982; the Del Matter, 2,883,783; the Highland, 2,982,045; and the several Swanson 3,059,569; 3,056,561; and 3,753,308. None of the above patents disclose or suggest applicant's device. From the above mentioned prior art, it can readily be concluded that numerous attempts have heretofore been made to develop or perfect the ultimate minnow dipper and holder. However, certain disadvantages prevail, e.g., it appears that possibly the success of certain of the above patents is hindered by the complex structure thereof. Obviously, the more complex the structure a device becomes the greater is the cost thereof. Additionally, the engineering advancements in the plastic industry have negated the effectiveness of certain possibly previously successful apparatuses, i.e., plastic items, particularly integrally formed items can be made much less expensive than prior metallic items and the like. Accordingly, a device that does not render itself toward being formed from plastic is not likely to remain successful.

SUMMARY OF THE INVENTION

The present invention is directed towards overcoming the disadvantages and problems relative to previous minnow scooper and holder devices. The concept of the present invention is to provide a very simple and inexpensive minnow scopper and holder. A further concept is to provide a minnow scooper and holder which may integrally be formed or molded from a suitable plastic substance. The device of the present invention is characterized by a sieve like receptacle or scoop having a handle fixedly attached thereto for scooping a minnow from a minnow bucket or the like. The receptacle is provided with an elongated downwardly directed opening which has a length at least as long as the minnow and a width at least as broad as the minnow whereby the minnow may freely pass lengthwise therethrough. A first holding element, preferably in the form of a comb, extends along one side of the opening and is fixedly attached to the receptacle with the teeth protruding ouwardly away from the opening. A second holding element, preferably in the form of a comb, extends along the opposite side of the opening. The outer ends of the teeth of the first and second holding elements normally converge, thus establishing a wedge shaped holding trough for receiving and aiding in restraining the minnow therein while facilitating the attachment of the fishhook thereto. The device preferably includes a tab like structure having the second element fixedly attached thereto. The inherent pliant resilience of the plastic substance enables the tab like structure to yieldably swing outwardly thus separating the first and second holding elements to provide a passageway to subsequently permit the minnow to be withdrawn outwardly through the bottom of the trough.

DESCRITPTION OF THE DRAWING

DESCRIPTION OF THE PREFERRED EMBODIMENT

Figure 1:
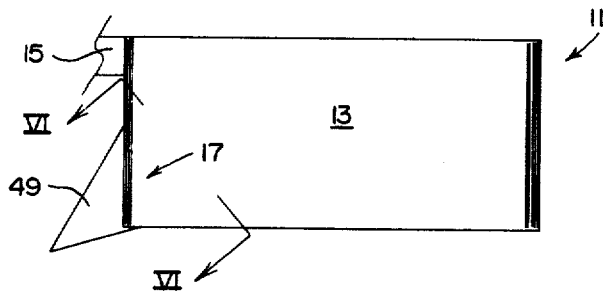
FIG. 1 is a side elevational view of the minnow scooper and holder device of the present invention having the handle member thereof deleted for brevity.
Figure 2:
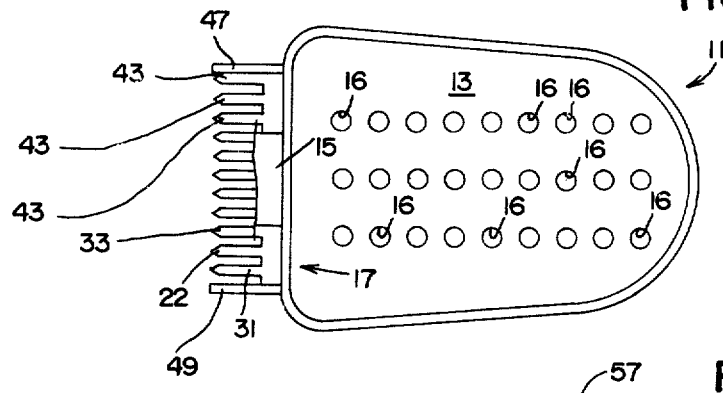
FIG. 2 is a top view thereof.
Figure 6:
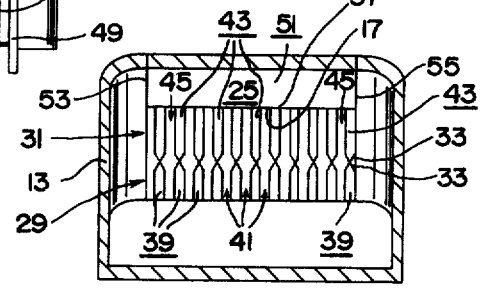
FIG. 6 is a sectional view taken as on the line VI—VI of FIG. 1.
Figure 4:
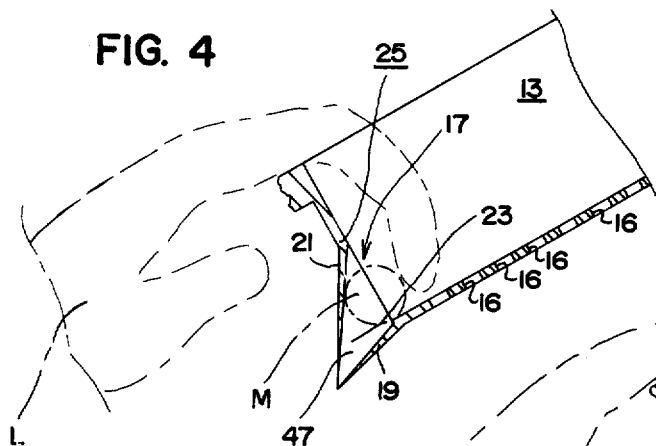
FIG. 4 is a sectional view taken as on the line IV—IV of FIG. 3 showing, in phantom lines, the hand of the user aiding in moving the minnow, also shown in phantom lines, into a trough.
Figure 5:
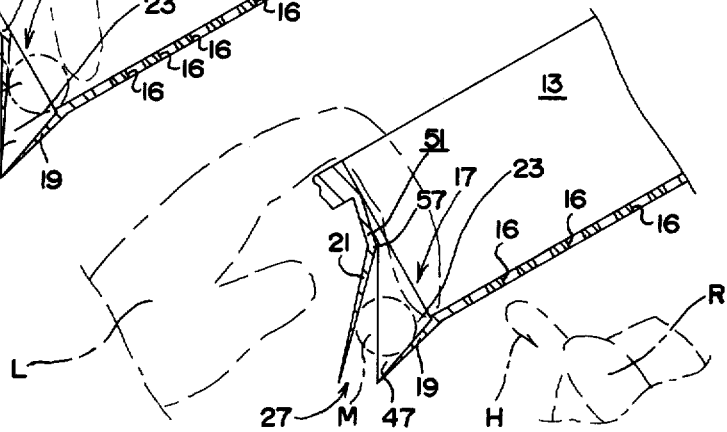
FIG. 5 is a view similar to FIG. 4 which additonally depicts, in phantom lines, a fishhook held in the right hand of the user, the fishhook is intended to be attached to the minnow while disposed in the trough, the left hand of the user is also shown urging the minnow outwardly as the trough is opened by the user.

The device 11 of the present invention is intended to be used for scooping or dipping a minnow from a minnow bucket or the like and for suitably holding or restraining the minnow to facilitate attachment of a fishhook thereto. The device 11 includes a sieve like receptacle 13 having a handle 15 fixedly attached thereto, a plurality of holes 16, and an open top to facilitate scooping a minnow, shown in phantom lines in FIGS. 4 and 5 and characterized therein by the capital letter M, from a minnow bucket or the like, not shown. The receptacle 13 is further characterized by being provided with an elongated opening 17 as best shown in FIG. 6 of the drawing. The dimensions of the opening 17 are such that the length thereof is at least as long as the minnow M and the width thereof is at least as broad as the minnow M whereby the minnow M may freely pass lengthwise therethrough. The device 11 includes a first holding element, as at 19, which extends along one side of the opening 17 and is fixedly attached to the receptacle 13, being disposed with a portion thereof protruding outwardly away from the opening 17. The device 11 also includes a second holding element 21 confrontingly arranged with respect to the first holding element 19. The second holding element extends along a side of the opening 17 opposite to the above mentioned one side thereof, as best shown in FIGS. 4 and 5 of the drawing. From FIGS. 2, 3 of the drawing it may be seen that the outer end of the holding element 21 terminates along a line, as at 22, which is disposed a spaced distance from the receptacle 13. The first and second holding elements 19, 21 establish in part a wedge shaped trough 23 (FIGS. 4, 5) for receiving and aiding in restraining the minnow M therein while facilitating attaching a fishhook thereto, i.e., the fishhook is depicted in phantom lines in FIG. 5 and characterized therein by the capital letter H. The device also includes means, e.g., a pliant web as at 25, for swingably attaching the second holding element 21 to the receptacle 13. Also included are bias means, e.g., the inherent resiliency of the pliant web 25, for yieldably urging the second holding element 21 toward the first holding element 19 whereby the second holding element 21 may selectively be manually yieldably urged away, e.g., by the left hand of a user depicted in phantom lines in FIG. 5 and characterized therein by the capital letter L, from the first holding element 19 thus providing a passaageway, as at 27 in FIG. 5, to subsequently permit passage therethrough of the minnow M outwardly through the bottom of the trough 23.

The first and second elements 19, 21 respectively preferably include first and second series of teeth, as at 29, 31, in FIG. 6 of the drawing. The first and second series of teeth 29, 31 are similar to segments of a comb as clearly shown for the series 31 in FIGS. 2, 3 of the drawing. It should be understood that the outer ends, as at 33, of the first and second series of teeth 29, 31 normally converge along the above mentioned line 22.

The first series of teeth 29 includes a plurality of individually parrallel spaced apart elongated tooth members 39 respectively having a substantially uniform cross section along the length thereof with the spaces, as at 41, between adjacent ones of the tooth members 39 slectively permitting free edgeways passage therethrough of the fishhook H, as indicated in FIG. 5 of the drawing. The fishhook H is shown held in the right hand of the user depicted in phantom lines in FIG. 5 and characterized therein by the capital letter R. Additionally, the second series of teeth 31 includes a plurality of individual parallel spaced apart elongated tooth members 43 respectively having a substantially uniform cross section along the lengths thereof with the spaces, as at 45, between adjacent ones of the tooth members 43 selectively permitting free edgeways passage therethrough of the fishhook H.

The device 11 preferably includes a pair of spaced apart wedge shaped flange members, as at 47, 49 extending outwardly from the receptacle 13. The flange members 47, 49 are disposed at either end of the opening 17 and define in part the trough 23.

The first and second series of teeth 29, 31 may be integrally formed with the receptacle 13 and the handle 15 in a manner obvious to those skilled in the art. In this event, the device 11 would preferably be molded from a plastic substance having an inherent pliant resiliency thereto.

Figure 3:
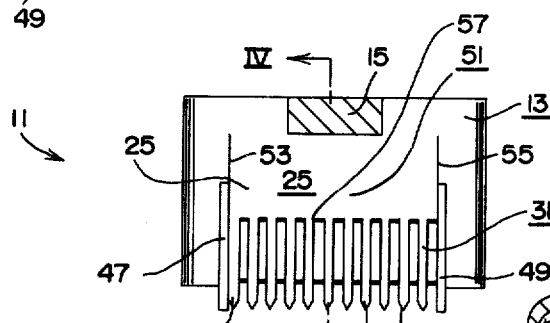
FIG. 3 is an end view thereof.

From FIG. 3 of the drawing it may be seen that the device 11 includes tab means, as at 51, for establishing the pivot means 25 and the bias means alluded to above. More specifically, the receptacle 13 is provided with a pair of slits, as at 53, 55, extending substantially parallel with the second series of teeth 31, as best viewed in FIG. 6 of the drawing. The slits 53, 55 lead into the opening 17 thus establishing the tab means 51. In this regard, the second series of teeth 31 depend from the tab means 51. Accordingly, the pliant resiliency of the plastic substance enables the tab means 51 to selectively be manually yieldably urged away from the first series of teeth, i.e., the second series of teeth 31 being carried therewith.

It should be understood that the tab means 51, being swingable as above disclosed, has at least a portion thereof confrontingly arranged with the first holding element. In other words, the confrontingly arranged portion preferaby comprises the second holding element or more specifically the second series of teeth 31. Further, the tab means 51 has a free swinging portion, as at 57, disposed adjacent the opening 17, i.e., the portion 57 preferably but not necessarily being the root ends of the several tooth members 43. However, the tooth members 43 may be deleted from the present invention in which event, the tab means 51 would extend beyong the portion 57, i.e., the outer ends of the holding element 19 and the tab means 51 normally converging along the previously mentioned line 22 which is disposed a spaced distance from the receptacle 13. Accordingly, if desired, at least a portion of the tab means 51 in conjunction with the holding element 19 may establish in part the previously described wedge shaped trough 23.

Although the invention has been described and illustrated with respect to a preferred embodiment thereof, it is to be understood that it is not to be so limited since changes and modifications may be made therein which are within the full intended scope of the invention.

I claim:

1. A minnow scooping and holding device comprising a sievelike receptacle having a handle fixedly attached thereto and an open top for scooping a minnow from a minnow bucket, said receptacle being provided with an elongated opening having a length at least as long as the minnow and a width at least as broad as the minnow whereby the minnow may freely pass lengthwise therethrough, a first holding element extending along one side of said opening and being fixedly attached to said receptacle with a portion thereof protruding outwardly away from said opening, a second holding element confrontingly arranged with said first holding element and extending along a side of said opening opposite to said one side thereof, the outer ends of said first and second holding elements normally converging along a line disposed a spaced distance from said receptacle, said first and second holding elements establishing in part a wedge shaped trough for receiving and aiding in restraining the minnow therein while facilitating attaching a fishhook thereto, means for swingably attaching said second holding element to said receptacle, and bias means for yieldably urging said second holding element toward said first holding element whereby said second holding element may selectively be manually yieldably urged away from said first holding element thus providing a passageway to subsequently permit passage therethrough of the minnow outwardly through the bottom of said trough.

2. The device of claim 1 in which said first element includes a first series of teeth.

3. The device of claim 1 in which said second element includes a second series of teeth.

4. A minnow scooping and holding device comprising a sievelike receptacle having a handle fixedly attached thereto and an open top for scooping a minnow from a minnow bucket, said receptacle being provided with an elongated downwardly directed opening having a length at least as along as the minnow and a width at least as broad as the minnow whereby the minnow may freely pass lengthwise therethrough, a first series of comblike teeth extending along one side of said opening and being fixedly attached to said receptacle with said teeth protruding outwardly away from said opening, a second series of comblike teeth confrontingly arranged with said first series of teeth and extending along the opposie side of said opening, the outer ends of said first and second series of teeth normally converging along a line disposed a spaced distance from said receptacle, said first and second series of teeth establishing in part a wedgeshaped trough for receiving and aiding in restraining the minnow therein while facilitating attaching a fishhook thereto, pivot means for swingably attaching said second series of teeth to said receptacle, and bias means for yieldably urging said second series of teeth toward said first series whereby said second series of teeth may selectively be manually yieldably urged away from said first series thus providing a passageway to subsequently permit passage therethrough of the minnow outwardly through the bottom of said trough.

5. The device of claim 4 in which is included a pair of spaced apart wedgeshaped flange members extending outwardly from said receptacle and being disposed at either end of said opening whereby said pair of flange members define in part said trough.

6. The device of claim 4 in which said first series of teeth includes a plurality of individual parallel spaced apart elongated tooth members respecitvely having a substantially uniform cross-section along the lengths thereof with the spaces between adjacent ones of said tooth members selectively permitting free sidewise passage therethrough of the fishhook.

7. The device of claim 4 in which said second series of teeth includes a plurality of individual parallel spaced apart elongated tooth members respectively having a substantially uniform cross-section along the lengths thereof with the spaces between adjacent ones of said tooth members selectively permitting free sidewise passage therethrough of the fishhook.

8. The device of claim 4 in which said first and second series of teeth are integrally formed with said receptacle and said handle.

9. The device according to claim 8 in which said integrally formed device consists of a molded plastic substance having an inherent pliant resiliency thereto.

10. The device according to claim 9 in which said device includes tab means for establishing said pivot means and said bias means, said receptacle being provided with a pair of slits extending substantially parallel with said second series of teeth and leading into said opening thus establishing said tab means, said second series of teeth depending from said tab means, the pliant resilience of said plastic substance enabling said tab means to selectively be manually yieldably urged away from said first series of teeth.

11. An integrally formed minnow scooping and holding device comprising a sievelike receptacle having a haandle fixedly attached thereto and an open top for scooping a minnow from a minnow bucket, said receptacle being provided with an elongated opening having a length at least as long as the minnow and a width at least as broad as the minnow whereby the minnow may freely pass lengthwise therethrough, a holding element including a plurality of parallel spaced apart elongated teeth respectively having a substantially uniform cross-section along the lengths thereof with the spaces between adjacent ones of said teeth selectively permitting free sidewise passage therethrough of a fishhook, said plurality of teeth extending in a substantially straight line along one side of said opening and being fixedly attached to said receptacle with said teeth protruding outwardly away from said opening, said device being formed from a substance having an inherent pliant resilience thereto, swingable tab means having at least a portion thereof confrontingly arranged with said first holding element and having a free swinging portion thereof disposed adjacent said opening, the outer ends of said holding element and said tab means normally converging along a line disposed a spaced distance from said receptacle, said holding element and at least a portion of said tab means jointly establishing in part a wedgeshaped trough for receiving and aiding in restraining the minnow therein while facilitating attaching the fishhook thereto, said tab means being selectively swingable yieldably away from said first holding element thus providing a passageway to subsequently permit passage therethrough of the minnow outwardly through the bottom of said trough.

12. The device of claim 11 in which said tab means includes an additional plurality of parallel spaced apart elongated teeth respectively having a substantially uniform cross section along the lengths thereof with the spaces between adjacent ones of said teeth selectively permitting free sidewise passage therethrough of a fishhook.

* * * * *